March 13, 1962

G. Y. GREIMAN ETAL 3,024,677

INTERNALLY THREADED HOLLOW METAL ARTICLE AND
METHOD AND APPARATUS FOR FORMING SAME

Filed Oct. 12, 1955

INVENTORS
GEORGE Y. GREIMAN
RICHARD D. FRYE
ROBERT W. FRYE
GORMAN C. BURD
BY
Harry O. Ernsberger
ATTORNEY

INVENTORS
GEORGE Y. GREIMAN
RICHARD D. FRYE
ROBERT W. FRYE
GORMAN C. BURD
BY
Harry O. Ernsberger
ATTORNEY United States Patent Office 3,024,677
Patented Mar. 13, 1962

1

3,024,677
INTERNALLY THREADED HOLLOW METAL ARTICLE AND METHOD AND APPARATUS FOR FORMING SAME
George Y. Greiman and Richard D. Frye, Erie, Mich., and Robert W. Frye and Gorman C. Burd, Toledo, Ohio, assignors to Neo Products Corporation, Erie, Mich., a corporation of Michigan
Filed Oct. 12, 1955, Ser. No. 540,014
4 Claims. (Cl. 80—5.1)

This invention relates to internally threaded metal articles or connectors and to a method and apparatus especially adapted to roll an internal thread upon a metal article and simultaneously impress knurling into one or more exterior surface zones of a metal article or connector.

Heretofore it has been commercial practice to form female type hose fittings or connectors with internal threads by conventional tapping operations. The method now in use for producing fittings of this character wherein internal threads are formed by tapping or cutting operations has been comparatively expensive due to the tool costs and the time involved in tapping the internal threads in the fittings or connectors.

The present invention embraces the provision of an internally threaded hose fitting or connector wherein the thread is of the rolled type, the fitting having exterior peripheral knurled zones providing an inexpensive fitting or connector which may be made economically in large quantities and which may be held to a high degree of precision and accuracy.

The invention embraces the provision of a method of rolling a thread interiorly of a fitting or connector wherein the metal is cold flowed or pressed inwardly by pressure means and simultaneously therewith impressing one or more knurled zones into the exterior periphery of the fitting or connector.

Another object of the invention is the provision of a method of rolling the metal of tubular material inwardly about a threaded or spiral formation to impress an internal thread or spiral configuration in the interior wall of the material wherein the several steps or operations of the method are carried on automatically and in proper sequence.

Another object of the invention resides in the provision of apparatus for rolling a thread on the interior surface of a hollow metal blank wherein the blanks are fed to a loading station and conveyed to a thread rolling or forming station and wherein the threaded work pieces are automatically rotated at the completion of the thread rolling operation to discharge the work pieces from a support.

Another object of the invention resides in an apparatus for forming female hose connectors or fittings wherein a thread is formed interiorly of a connector by pressure rolls and concomitantly therewith knurled zones are formed on the exterior periphery of the connector wherein the knurled zones are spaced longitudinally of the fitting.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

2

While the forms of novel apparatus of the invention illustrated in the drawings are especially adapted for forming internal threads and exterior knurling on female connectors, it is to be understood that the arrangement of the invention may be used for forming threads or spiral configurations on various articles of tubular material or work pieces or wherever the invention may be found to have utility.

Figure 1:
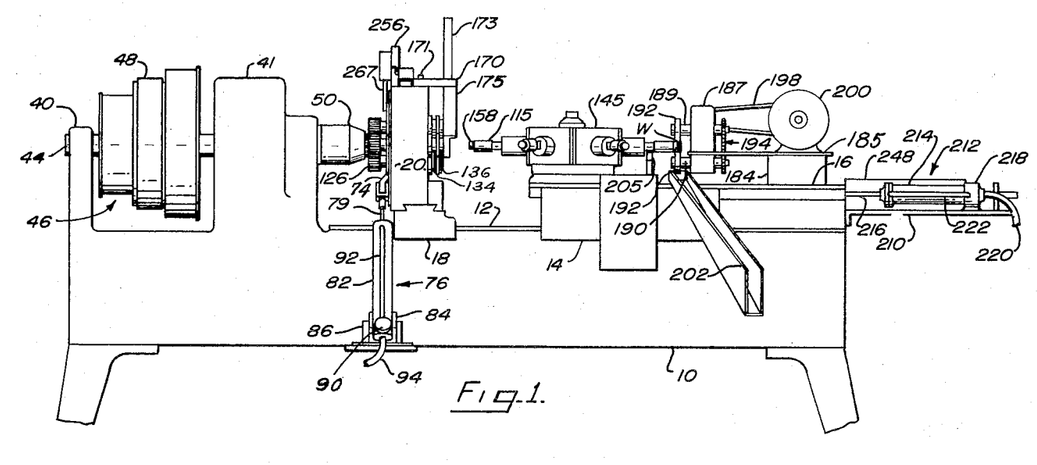
FIGURE 1 is a side elevational view showing one form of novel apparatus for carrying out the method of the invention.
Figure 2:
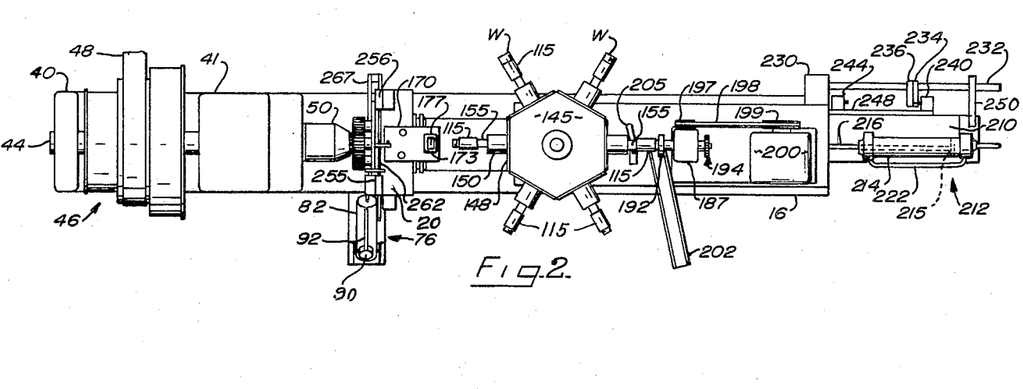
FIGURE 2 is a top plan view of the arrangement shown in FIGURE 1.

Referring to the drawings in detail and initially to FIGURES 1 and 2, there is illustrated a form of apparatus of the invention. The arrangement is inclusive of a frame 10 formed with longitudinally extending ways 12 upon which is mounted a support 14 which in turn is provided with ways which support a carriage or member 16 arranged for slidable movement. Initial position of support 14 may be obtained by adjusting means (not shown) whereby the support may be disposed in proper position during operation of the apparatus.

Also mounted upon the ways 12 is a block or supporting member 18 formed with transverse ways 20, the block 18 supporting a head or member 20. The member 20 carries the pressure devices or pressure rolls for performing operations upon tubular material or hollow work pieces.

The apparatus is especially adapted for forming an internal thread and exterior knurled zones on a female connector or fitting for hose or on any tubular material where it is desired to form a spiral ridge or thread interiorly of tubular material. A connector of the invention is shown at 25 in FIGURES 12 and 13 and as illustrated, is formed with an internal thread or spiral ridge 27 which is produced by applying pressure through pressure rolls to a zone 28 exteriorly of the connector.

The zone 28 is disposed between peripheral knurled zones or surfaces 29 and 30. One end of the connector is provided with an inwardly extending flange 32 which defines an opening 33 to receive a ferrule (not shown) for connecting the hose to the fitting or connector 25. The member or head 20 provides a supporting means for carrying the pressure applying means or rolls for forming the internal thread 27 and the knurling rolls for forming the exterior knurled zones 29 and 30 upon the connector.

The slide or carriage 16 supports a means for carrying the work pieces or blanks to form the connectors and also supports means for removing the finished connectors or work piece from the supporting means.

The frame 10 of the machine is provided at one end with upwardly extending portions 40 and 41 which contain bearings journally supporting a driving shaft 44. Secured on the driving shaft 40 is a stepped pulley construction 46 driven by a belt 48 from another similar pulley construction (not shown) which in turn is driven by an electric motor or other suitable source of power. The speed of the drive shaft 44 may be varied by shifting the belt 48 to pulleys of different diameters.

Figure 3:
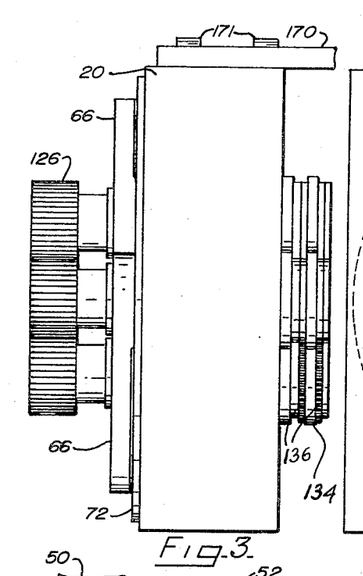
FIGURE 3 is a side elevational view of the pressure rolls and driving means therefor.
Figure 4:
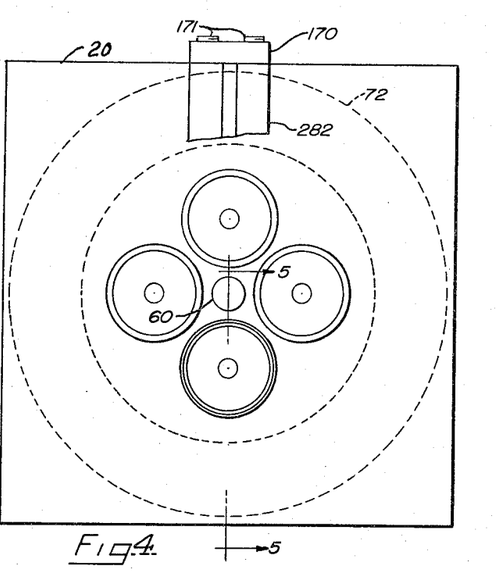
FIGURE 4 is an end view of the construction shown in FIGURE 3.
Figure 5:
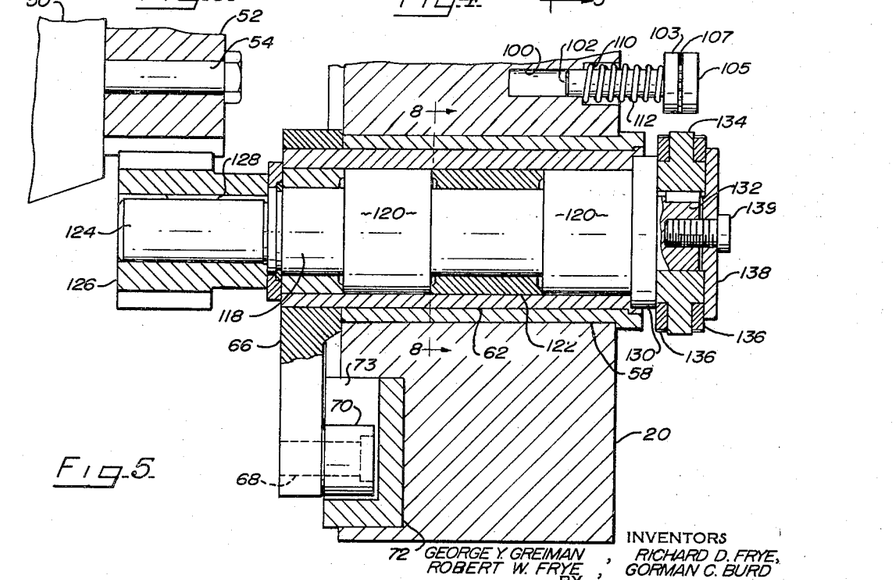
FIGURE 5 is an enlarged fragmentary vertical sectional view taken substantially on the line 5—5 of FIGURE 4.

The shaft 44 is provided with a head or chuck 50 which supports and drives a gear or pinion 52 (FIG. 5) secured to the member 50 by means of a bolt 54. The support member 20 is of substantially rectangular configuration as shown in FIGURES 3 and 4 and carries the pressure applying devices and knurling means. With particular reference to FIGURE 5, the support or member 20 is bored to accommodate bearing sleeves or bushings 58, there being four of the bushings disposed at equal distances from the center or axis of rotation of the driving pinion 52.

Figures 6, 7, 8, 9:
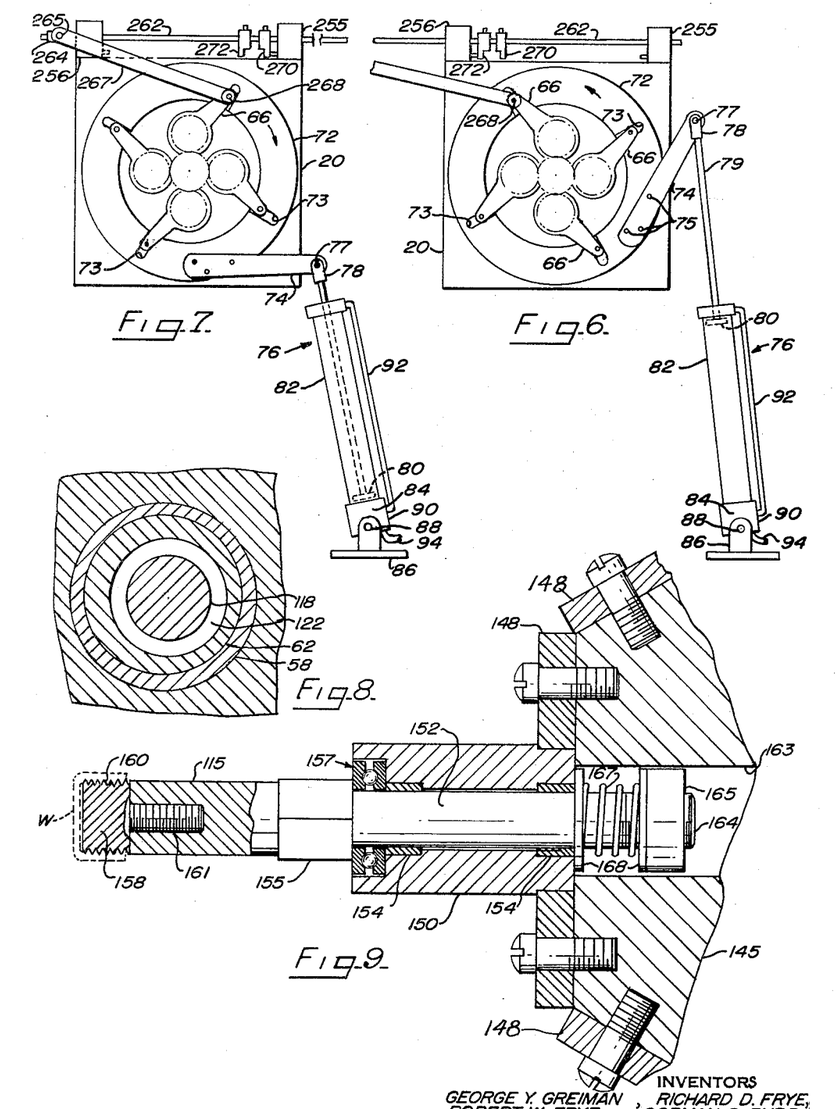
FIGURE 6 is a rear end view of the construction shown in FIGURE 3 illustrating a fluid operated means for actuating the pressure rolls.
FIGURE 7 is a view of the mechanism shown in FIGURE 6 with the pressure rolls in their maximum operative position in forming an internal thread and an exterior knurling upon the work.
FIGURE 8 is a sectional view taken substantially on the line 8—8 of FIGURE 5.
FIGURE 9 is a horizontal sectional view showing a mandrel adapted to support the work.
Figure 14:
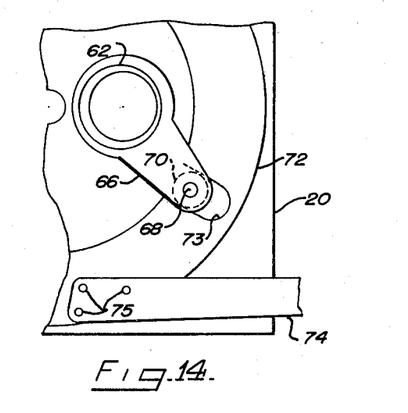
FIGURE 14 is a fragmentary elevational view of one of the eccentric mountings for a pressure roll.

Disposed within each of the bushings 58 is an eccentric sleeve or member 62 shown in FIGURE 8, which is rotatable in a bearing sleeve 58. Secured to each of the eccentric sleeves 62 is an arm or member 66 which is keyed upon the eccentric sleeve to rotate therewith. Each of the arms 66 is provided with a pin 68 which journally supports a roller or follower 70 as shown in FIGURES 5 and 14.

The block or head 20 is formed with an annular recess to receive an annulus or ring 72. The ring 72 is provided with radially arranged U-shaped recesses or channels 73 into which extend rollers 70, there being one roller projecting into each recess. The ring or annulus 72 is rotatable relative to the stationary head or member 20. As particularly shown in FIGURES 6 and 7, an arm 74 secured to the ring 72 by screws 75 is connected with fluid actuated means 76 for rotating the ring 72 through a portion of a revolution for moving the pressure rolls and knurling rolls into and out of engagement with a work piece.

Pivoted to a pin 77 carried by the end of the arm 74 is a clevis 78 secured to the end of a piston rod 79, the latter being equipped with a piston 80 contained within a cylinder 82 of the actuator or actuating means 76. The lower end of the cylinder 82 is equipped with a fitting 84 which is pivoted to a stationary bracket or support 86 by means of a trunnion or pivot means 88.

Secured to the lower end of the cylinder 82 is a housing 90 in which solenoid actuated valve means is disposed for controlling the flow of compressed air or other fluid alternately into opposite ends of the cylinder for reciprocating the piston 80. The upper and lower end zones of the cylinder 82 are connected by means of a tube 92 for conveying air under pressure to a zone above the piston 80 for causing downward movement of the piston as viewed in FIGURES 6 and 7. A flexible tube or conduit 94 is connected to the valve housing 90 and conveys compressed air or other fluid under pressure into the valve housing wherein the valve mechanism controls the delivery of the compressed air into one or the other ends of the cylinder 82.

As each of the arms 66 is connected with an eccentric sleeve 62, rotative movement of the annulus or ring 72 causes a substantial radial movement of the pressure and knurling rolls into engagement with and away from the work piece depending upon the direction of rotation of the ring 72. As shown in FIGURE 7, the ring 72 is in its maximum rotative movement in a clockwise direction in which position the pressure rolls and knurling rolls are out of engagement with the work. FIGURE 6 is illustrative of the position of the ring 72, arms 66 and piston 80 at the maximum movement of the ring 72 in a counter-clockwise direction, in which position the pressure and knurling rolls are in their maximum innermost radial positions, and in which position the work upon the work piece or tubular material has been completed.

The block or member 20 is formed with a bore 100 (FIG. 5) arranged to receive a shaft or pin 102, the latter being formed with a head portion 103. A disk-like member 105 is journally supported on the head 103 by means of antifriction or ball bearings 107 whereby the disk 105 is arranged for free rotation independently of the head 103. The block 20 is formed with a counterbore 110 to accommodate an expansive coil spring 112, the latter normally biasing the head 103 and disk 105 in a righthand direction as viewed in FIGURE 5. The disk 105 forms an abutment resiliently biased outwardly by the spring 112 for engagement with the flanged end of the work piece during the formation of the internal thread and the knurled zones on the work piece. The member 103 is slightly spaced from the head 20 when the work is in a position to be engaged by the pressure rolls so as to permit member 103 to move longitudinally to accommodate lengthwise flowing or distortion of the metal of the work resulting from pressure of the rolls.

The work pieces are individually supported upon arbors or mandrels 115, one of which is illustrated in detail in FIGURE 9, the work piece or blank W being illustrated in broken lines in FIGURE 9. Referring to FIGURE 5, each of the eccentric sleeves or bushings 62 houses or encloses a shaft 118 journaled upon bearings 120 which may be of the antifriction type and which are held in spaced relation by a collar or spacer 122. Each shaft 118 is formed with a tenon portion 124 upon which is secured a gear or pinion 126 held thereon by means of a key 128.

Each of the pinions 126 is in constant mesh with the driving pinion or gear 52 and the size of the teeth of pinions 52 and 126 is such that the radial movement of shafts 118 resulting through shifting of the positions of the eccentric sleeves 62 does not disengage the teeth of the gears so that a constant drive to the shafts 118 is maintained.

Each of the shafts 118 is formed with an enlargement or flange portion 130 and a tenon portion 132 of reduced diameter. Mounted upon the tenon portion 132 for rotation with the shaft 118 is a roll 134 which is arranged to engage the exterior periphery or surface of the work piece W through relative movement of the eccentric sleeve 62 to apply pressure on the work piece for forming the thread or spiral ridge interiorly thereof. One of the pressure rolls 134 is formed with peripheral recesses adapted to receive knurling rolls or rings 136 arranged at each side of a pressure roll.

The knurling rolls 136 are formed with knurled peripheral surfaces which are concomitantly engaged with the work piece with the pressure rolls 134 to impress knurled configurations on longitudinally spaced zones of the work. The knurling rolls or annular members 136 being of lesser diameter than the pressure rolls, are mounted on one of the pressure rolls 134 for independent rotation so that a knurled configuration may be properly impressed in the exterior surface of the work piece. A plate 138 secured to the tenon 132 of the shaft 118 by means of a bolt 139 maintains the pressure roll 134 and knurling rolls 136 of each unit in operative relation as shown in FIGURE 5.

As the pressure rolls 134 carried by the shafts 118 are simultaneously and continuously driven, the pressure rolls are caused to be moved simultaneously into engagement with the work piece from diametrically opposite zones together with the knurling rolls through the movement of the eccentrics or sleeves 62 by rotation of the annulus 72 under the influence of the fluid actuator 76. While four pressure roll units have been illustrated, it is to be understood that two or more units may be used if desired.

With particular reference to FIGURES 1 and 2, the carriage or slide 16 supports a means upon which the work pieces are mounted during work performing operations. Supported upon the slide or carriage 16 is a turret-like member 145 of polygonal shape as shown in FIGURE 2. Each of the facets of the member 145 is equipped with means carrying a work supporting arbor or mandrel 115, the construction of one of the mandrels and its supporting means being shown in FIGURE 9. Secured to each of the facets or walls of the polygonally shaped turret is a plate 148. Secured to the plate 148 is a cylindrical member 150 having a portion of reduced diameter pressed into or otherwise fixedly secured in an opening in the plate 148.

The arbor 115 is formed with a shaft portion 152 of reduced diameter which is journaled for rotation in bearings or bushings 154 mounted in recesses formed in the cylindrical member 150. The arbor 115 is provided with a squared or polygonally shaped portion 155 which abuts against an anti-friction thrust bearing 157 mounted in the cylindrical member 150, the anti-friction bearing being preferably of the ball type as illustrated in FIGURE 9.

The engagement of the squared portion 155 with the bearing means 157 limits the longitudinal movement of the arbor toward the turret-like member 145 to properly position the workpiece adjacent the pressure and knurling rolls during work performing operations. One end zone of the arbor 115 is formed with a hardened metal extension or arbor portion 158 which is formed with a threaded or spirally grooved configuration 160 which provides a matrix to produce the internal thread or spiral ridge on the workpiece W, the latter being shown in broken lines in FIGURE 9. The grooved arbor section 158 is formed with a tenon 161 threaded into a bore formed in the arbor 115.

The shaft portion 152 of the arbor extends into a bore 163 formed in the turret member 145 and is threaded as at 164 to receive an abutment or collar 165. An expansive coil spring 167 is disposed between the cylindrical member 150 and the abutment collar 165 for biasing or urging the arbor 115 toward a position wherein the squared portion 155 engages the bearing means 157. Collars or washers 168 are positioned respectively adjacent the abutment collar 165 and member 150 and are directly engaged by the coil spring 167 in the manner shown in FIGURE 9. The turret-like member 145, which is of hexagonal shape in the apparatus illustrated in FIGURES 1 and 2, supports a plurality of arbors 115, there being six illustrated in the embodiment of the invention shown in FIGURES 1 and 2.

The arbors 115 and their mounting arrangements are identical with that shown in FIGURE 9 and described herein.

Means is provided for maintaining a supply of work blanks in a position to be delivered or fed successively to a loading zone where they are selectively removed by the grooved arbor section 158 of an arbor 115 and moved by the arbor from the loading zone to a work performing zone or position adjacent the pressure and knurling rolls. With particular reference to FIGURES 1 through 4, a plate 170 is secured to the upper surface of the head or member 20 by means of securing bolts 171. Mounted upon the plate 170 is a chute or container 173 adapted to receive and maintain a supply of workpieces or blanks W to be delivered to the loading zone.

Figures 15, 16:
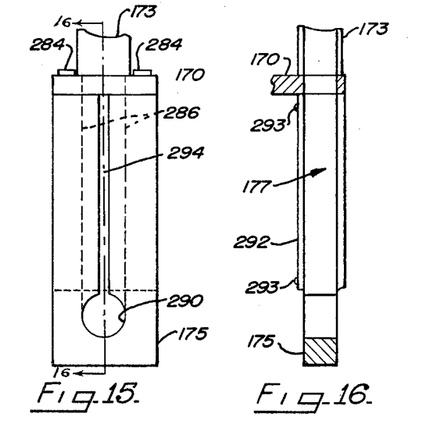
FIGURE 15 is a detail elevational view of the work piece feeding means.
FIGURE 16 is a sectional view taken substantially on the line 16—16 of FIGURE 15.

The plate 170 supports a member 175 which is formed to provide a channel or passage 177 of a dimension to convey the workpieces or blanks from the chute or hopper 173 in a single column to the loading station. The work feeding means is shown in FIGURES 15 and 16 and is hereinafter described in detail. The lowermost workpiece W of the column or supply of work pieces is disposed in a circular opening 290 to position the same in alignment with the grooved arbor section 158 so that upon longitudinal movement of the arbor 115 toward the work performing station, the workpiece is properly telescoped onto the portion 158 as the latter moves through the opening 290 in the member 175.

Figure 10:
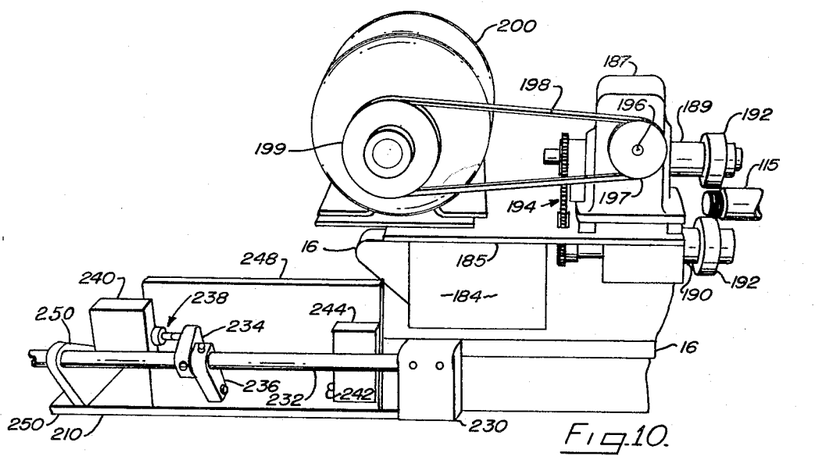
FIGURE 10 is a perspective view illustrating a form of means for automatically removing the work from the supporting mandrel.

The carriage 16 is equipped with means for unthreading or removing the finished articles from the grooved sections 158 of the arbors 115. As shown in FIGURES 1, 2 and 10, the carriage 16 is formed with a block 184 upon which is supported a plate or member 185. Secured to the plate 185 is a housing construction 187. Journaled in the housing construction 187 are shafts 189 and 190, each of which supports a rotatable means, metal member or roll 192 which has a roughened or knurled periphery or may be faced with non-metallic material as for example rubber, imitation rubber, leather or the like.

The shafts 189 and 190 are adapted to be driven simultaneously through a sprocket and chain drive means designated 194. Mounted within the housing 187 is suitable gearing (not shown) connected with a shaft 196 equipped with a pulley 197 connected by a driving belt 198 with a pulley 199 driven by a motor 200 or other suitable power source or means mounted on the plate 185.

The rolls 192 are spaced so that when an arbor 115 bearing a finished workpiece is moved into a position between the rolls, the rotating rolls 192 frictionally engage the exterior surface zone of the finished workpiece and rotate the finished workpiece in a direction relative to the arbor 115 so as to unthread or remove the finished article from the arbor. The article removed from an arbor drops into a trough 202 or other means adapted to convey the finished pieces from the apparatus.

Secured to the slide 16 is a plate-like spring 205, shown in FIGURES 1 and 2, having a portion adapted for engagement with the squared or polygonal portion 155 of an arbor. When an arbor bearing a finished workpiece is moved into the zone between the rolls 192, the plate spring 205 engages a facet of the square portion 155 prevents rotation of the arbor whereby the rolls 192 are effective to unscrew or unthread the finished workpiece from the arbor section 158.

The rolls 192 may be continuously operated by the motor 200 so that whenever an arbor carrying a finished workpiece is moved between the rolls, rotation of the rolls removes the finished piece from the arbor.

The slide or carriage 16 is adapted to be reciprocated or moved longitudinally of the frame 10 of the machine. At each longitudinal retracting movement of the carriage and the turret member 145 carried thereby, the turret is revolved one-sixth of a revolution by pawl and ratchet wheel means (not shown) in a conventional manner to move a succeeding arbor into position to receive a work blank and to bring an arbor carrying a finished work blank between the rolls 192 whereby the rolls remove the finished workpiece.

Means is provided for reciprocating the slide or carriage 16. Secured to the member 14 is an extension or supporting plate 210 on which is mounted a fluid actuating means 212 which includes a cylinder 214 within which is reciprocally mounted a piston 215 secured upon the end of a rod 216 which is fixedly connected with the carriage 16. In the embodiment illustrated, the actuator 212 is adapted to be operated by compressed air but it is to be understood that other types of fluid actuator may be utilized if desired. The outer end of the cylinder 214 is equipped with a housing or fitting 218 which encloses solenoid operated valve means for controlling the flow of fluid to opposite sides of the piston in the cylinder 214. Compressed air or other fluid from a supply is conveyed to the valve mechanism in the fitting 218 by a conduit or tube 220.

A by-pass 222 connects the valve arrangement in the fitting 218 with the opposite end of the cylinder 214. Through the solenoid operated valve arrangement contained in the fitting 218, compressed air or pressure fluid may be delivered into the cylinder alternately at opposite ends to effect a reciprocation of the carriage 16.

Means are provided for initiating and controlling the operation of the actuators 76 and 212 to carry out the various operations or steps in the method of forming an internal spiral ridge or thread and an external knurled zone upon a tubular or hollow work piece. Secured to the carriage 16 is a block 230 to which is fixedly secured a control rod or shaft 232. Adjustably mounted on the rod 232 are switch actuating means or members 234 and 236.

Member 234 is arranged to engage and actuate a momentary impulse or electro snap switch 238 contained in the housing 240 and the member 236 is arranged to engage and operate a multiple position switch 242 contained within a switch housing 244. The switch housings 240 and 244 are secured to a supporting plate 248 carried by the plate or support 210. The rod 232 is supported in a guide member 250 which is fastened to the plate 210. The rod 232 reciprocates with the carriage 16 so as to alternately engage the switch operating members 234 and 236 with the switches 238 and 242 at each limit of movement of the carriage 16.

Means is provided for controlling the operation of the fluid actuator 76 for bringing the pressure rolls and the knurling rolls into and out of engagement with a work piece. Referring particularly to FIGURES 6 and 7, the block or head 20 supports housings 255 and 256, the housing 255 enclosing a multiple position switch 258, the housing 256 enclosing a microswitch 260, the switches being shown diagrammatically in the circuit diagram, FIGURE 11.

A rod or shaft 262 is slidably mounted in openings or bores formed in the housings 255 and 256. One end of the rod 262 is provided with a member 264 having a pivot shaft 265 to which is connected a bar or arm 267. The arm 267 is pivoted at its opposite end to a pin 268 carried by one of the arms 66 which carries one of the eccentric sleeves 62. Mounted upon the rod 262 are abutments or switch actuating dogs or members 270 and 272, the switch actuating members being adjustable on the shaft 262. When the shaft 262 is moved in a right-hand direction as viewed in FIGURE 6 by movement of the piston 80 downwardly in the fluid actuator 76, the abutment 270 engages the switch 258, while movement of the rod 262 in the opposite direction causes the stop member 272 to engage the microswitch 260.

FIGURES 15 and 16 illustrate in detail the feeding means or magazine for delivering work blanks or work pieces into a loading zone or position at which the work blanks are successively picked up by the arbors 115. The plate 170 supports a generally U-shaped member 175 held to the block by means of screws 284.

The interior walls 286 of the leg portions of member 175 define the width of a channel or passage 177 into which the work blanks are delivered from the chute 173 and move downwardly into the circular configuration or zone 290 which forms a loading station. The rear of the member 175 is provided with a plate 292 secured in place by screws 293 providing the rear wall of the channel 177. The rectilinear space 294 bounded by the interior adjacent surfaces of the U-shaped portions of member 175 provides a sight opening for visual inspection of blanks or work pieces in the magazine.

Figure 11:
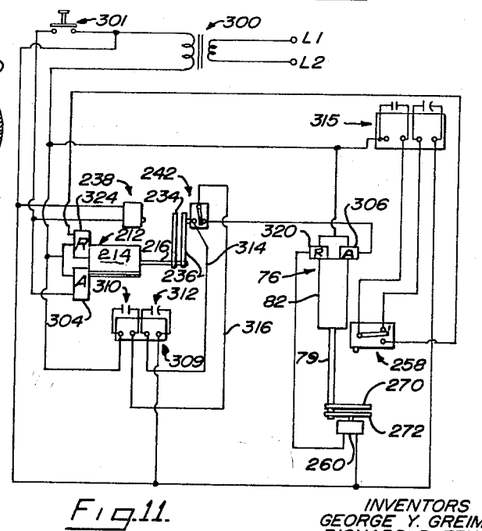
FIGURE 11 is a schematic diagram of the fluid actuating components and electrical controls therefor for automatically actuating mechanisms in proper sequence.

FIGURE 11 illustrates in a diagrammatic form the circuits, switches and other electrical controls for the fluid actuating means hereinbefore described. As shown in FIGURE 11, a current supply is fed from a source through lines L1 and L2 through a transformer 300 and a starting switch 301. The momentary impulse switch 238 is connected in circuit with solenoid means of a valve mechanism diagrammatically indicated at 304 which controls the flow of compressed air into the actuator or cylinder 214 to advance the piston rod 216 and the carriage 16 to a work piece engaging and work forming position.

A switch means 242 when engaged by dog 236 establishes a circuit with a solenoid operated air valve means indicated at 306 for controlling delivery of compressed air into the actuator cylinder 82 for closing the pressure and knurling rolls upon the work. The movable arm of switch 242 is connected by a conductor 316 with a capacitor 310 of a control unit 309, and a selenium or other type rectifier 312 is connected with another contact of the switch means 242 by a conductor 314.

The line current or current supply L1, L2, may be, for example one hundred ten volts, and this voltage is reduced by the transformer 300 so that the secondary circuit is of low voltage, for example eight volts. The unit comprising the capacitor 310 and the selenium rectifier 312 is known commercially as a Pulsa-Pak unit. The rectifier 312 changes the alternating current to direct current and the capacitor 310 functions to store electric energy to provide an instantaneous high impulse requisite to operate the solenoid mechanism for the valves of the fluid actuators. A second Pulsa-Pak unit 315 is also utilized in connection with the control switch 258.

The dog 272 engaging the switch 260 at the completion of the pressure roll and knurling operation causes operation of the solenoid operated valve mechanism 320 to direct compressed air into the actuator cylinder 82 to retract the piston rod 79 and rotate the ring 72 and retract the eccentric sleeves 62 to their positions disengaging the pressure and knurling rolls from the work piece. A second dog 270 on rod 262 is adapted upon retraction of the piston rod 79 to cause the actuation of solenoid operated valve means indicated at 324 through the control unit 315. The valve means 324 directs compressed air into the carriage actuator 212 to retract the rod 216 and the carriage 16.

Figure 12:
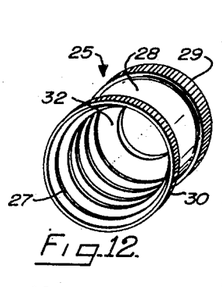
FIGURE 12 is an isometric view of a female hose connection or fitting of the invention.
Figure 13:
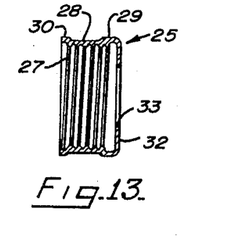
FIGURE 13 is a sectional view through the hose connection or fitting of the invention.

The operation of the apparatus shown in FIGURES 1 through 11 for impressing an internal thread and external knurled zones upon the female hose connection 25 shown in FIGURES 12 and 13 is as follows: The chute or hopper 173 is filled with hollow work pieces or blanks W of the general shape of the hose fitting shown in FIGURE 12 with smooth interior and exterior walls terminating at one end in the inwardly extending flange 32.

The work pieces or blanks are introduced into the chute 173 and magazine 177 so that the open ends of the blanks are in a position to be received upon the spirally grooved or threaded zones 158 of the arbors 115.

A supply of compressed air or other pressure fluid is delivered through the tubes 94 and 220 to the actuators 76 and 212 respectively so that air under pressure is constantly available at the zones of the solenoid operated valves for controlling the flow of compressed air into the actuator cylinders.

The motor (not shown) for rotating the spindle 50 and the pressure and knurling rolls is started by closing suitable switch means to continuously drive or rotate the spindle 50, the driving pinion 52, the gears 126, the pressure rolls 134 carrying the knurling rolls 136. The operator then depresses or closes the switch 301 shown in the circuit diagram in FIGURE 11 to initiate the cycle of operations of the apparatus of the invention. The actuator 212, when the apparatus is not operating, is normally in carriage-retracting position. The closing of the switch 301 energizes solenoid 304 and the valve controlled thereby directs air into the one end of cylinder 214 to advance rod 216 and the carriage 16. As the carriage moves forward, one of the arbors 115 is in alignment with the spindle 50 and is moved through the opening 290 in the chute construction 175. The work piece W disposed in the circular opening 290 is picked up by the grooved section 158 of the arbor 115 and occupies the position on the arbor as shown in FIGURE 9.

The advancing arbor causes the work piece to engage and move the resiliently supported abutment 105 shown in FIGURE 5, in a lefthand direction as viewed in FIGURE 5, bringing the work piece into a position adjacent the pressure and knurling rolls. When the carriage has moved to this position, the dog 236 engages switch 242 and releases electrical impulse from the Pulsa-Pak or control unit 309 to energize solenoid 306 indicated in FIGURE 11 and moves the valve controlled thereby to introduce fluid or compressed air into the cylinder 82 to advance the piston rod 79.

With particular reference to FIGURES 6 and 7, the upward movement of the piston rod 79 rotates the ring or annular movement of the piston rod 79 rotates the ring or annular member 72 through a circumferential distance enabling the movement of the arms 66 so as to shift the relative positions of the eccentric means or sleeves 62 to concomitantly move all of the pressure and knurling rolls toward and into engagement with the work piece. The degree of eccentricity of the sleeves 62 and the extent of rotation of the annular member or ring 66 are such that the metal of the central zone 28 of the female hose connector 25 which is formed from the work piece W is forced or pressed inwardly radially of the axis of the work piece into the threads or spiral grooves 160 in the grooved section 158 of the arbor 115 and the knurling configuration of the knurling rolls impressed in the circumferential longitudinally spaced zones 29 and 30 of the connector shown in FIGURES 12 and 13.

After the piston 79 in the actuator 82 has moved to its extreme advanced position completing the thread forming and knurling operations, the dog 272 engages the microswitch 260 to energize a circuit to the solenoid 320 actuating a valve to retract the rod 79, rotating the annular member 72 in a clockwise direction as viewed in FIGURE 7, thus moving the pressure and knurling rolls away from engagement with the work piece W. The rod 262 carrying the dogs 270 and 272 is moved in a righthand direction as viewed in FIGURE 7 until the dog 270 engages the multiple position switch 258 contained in the housing 255 which releases an electrical impulse from the Pulsapak or control unit 315 to actuate solenoid 324 operating a valve to direct compressed air into the outer end of cylinder 214 to retract the carriage to its initial position.

When the carriage 16 is retracted, it carries with it the turret-like member 145 and the arbors 115. The turret 145 at each retraction of the slide or carriage 16 is rotated one sixth of a revolution in a clockwise direction as viewed in FIGURE 2. Thus several of the arbors of the turret-like member 145 are carrying completed work pieces, the internal threads holding each completed work piece on its adjacent arbor 115 by the grooves in the arbor sections 158. As one of the arbors 115 bearing a completed workpiece approaches the work removing rolls 192, the plate spring 205 engages the square portion 155 as shown in FIGURE 2, and the pressure of the plate spring 205 prevents rotation of the arbor 115. As the work piece W carried by the arbor moves between the rotating rolls 192, they engage and unthread or remove the work piece from the grooved section 158 of the arbor.

When the work piece is completely free of the arbor, it falls into a discharge chute 202 and is thereby conveyed away from the work removing station. The rolls 192 rotate at a comparatively high speed so that the completed work piece is removed from the arbor in a short period of time. The cycle is automatically repeated as the dog 234 engages the momentary impulse switch 238 as the slide or carriage 16 approaches its retracted limit of slidable movement. Actuation of the switch 238 operates the solenoid 304 of the valve mechanism to again move the carriage 16 toward the thread forming and knurling rolls, the arbor in line with the lowermost work piece or blank in the chute 177 picking up the blank and moving the same into position to be operated upon by the pressure and knurling rolls.

Figure 17:
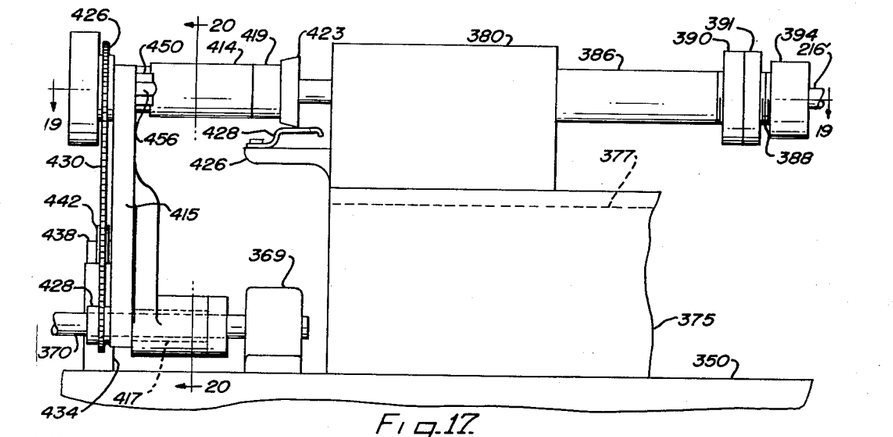
FIGURE 17 is an elevational view of a modified form of apparatus of the invention.
Figure 18:
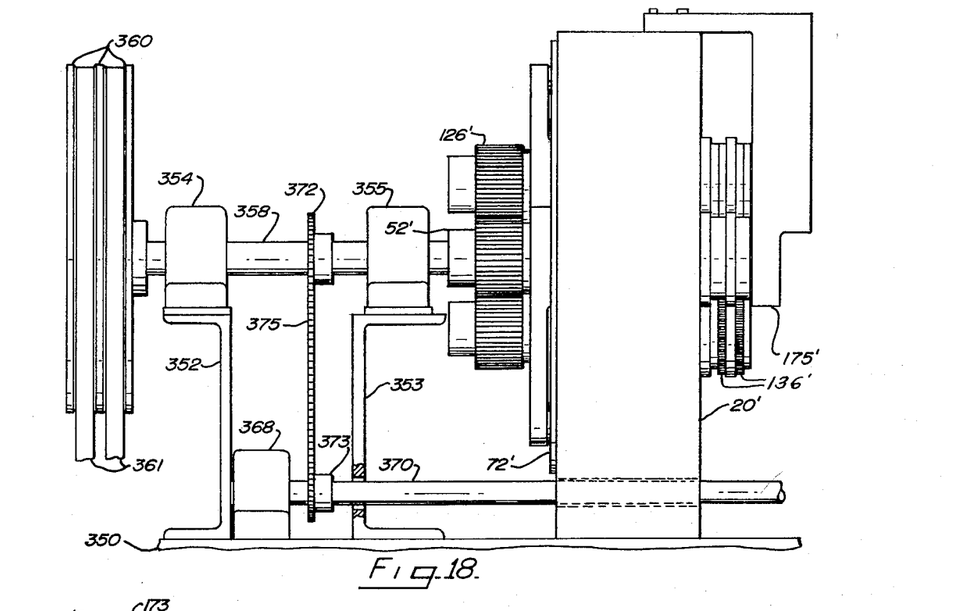
FIGURE 18 is an elevational view illustrating an additional portion of the arrangement shown in FIGURE 17.

FIGURES 17 through 21 illustrate another form of novel apparatus for carrying out the method of the invention. FIGURE 17 shows the right half of the machine and FIGURE 18 shows the left portion of the machine. The apparatus of FIGURES 17 and 18 is mounted upon a frame or support 350 which may be mounted upon legs or other suitable means. Mounted upon one end of the support 350 are transversely extending channel shaped members 352 and 353 supporting respectively bearings 354 and 355.

Journally supported in the bearings 354 and 355 is a shaft 358 equipped with sheaves or pulleys 360 driven by belts 361 connected to sheaves by a motor (not shown). The frame 350 supports bearings 368, 369 in which is journalled a shaft 370 arranged in parallelism with shaft 358. The shafts 358 and 370 are respectively provided with sprockets 372 and 373 connected by a chain 375 whereby the shaft 370 is driven from the shaft 358.

The frame 350 supports the member or head 20' which is identical with the member 20 of the apparatus hereinbefore described. The member 20' carries a set of pressure and knurling rolls identical with those shown in FIGURE 1 which are driven by gears 126'. The drive gear 52' for driving gears 126' is fixedly secured upon the end of shaft 358. In this form of the invention, the shaft 358 drives the gears 126' and the pressure and knurling rolls in the same manner as the arrangement shown in FIGURES 1 and 2. The shafts supporting the pressure and knurling rolls are eccentricaly mounted and are adjusted by movement of the annulus or ring 72' to move the pressure and knurling rolls into and out of engagement with the work.

The work blanks are fed to the loading station through a chute by a delivery chute or feeding means 175. With particular reference to FIGURE 17, it will be seen that the bed or frame of the machine 350 carries a subframe 375 which is equipped with an upwardly extending portion 380 which may be adjusted longitudinally of the subframe 375 along the ways 377. The portion 380 is formed with a longitudinally extending bore 382 the axis of which is in alignment with the axis of shaft 358.

Bearings or bushings 384 are disposed within the bore and a sleeve, hollow shaft or spindle 386 is slidably mounted therein. One end zone of the sleeve 386 is threaded as at 388 to receive an abutment block 390 and a locking nut 391. The block 390 may be adjusted on the hollow shaft 386 to limit movement of the shaft in a lefthand direction as viewed in FIGURE 17 in order to position the work piece W adjacent the thread forming and knurling rolls.

Also threaded upon the end of shaft 386 is a fitting 394 to which is connected a rod 216' which forms a part of a fluid actuator identical with fluid actuator 212 shown in FIGURES 1 and 2. The fluid actuator, through the medium of the piston rod 216' effects reciprocation of the sleeve 386 and the arbor 408. Fixedly secured interiorly of the shaft 386 are spaced bearings or bushings 398 in which a shaft 400 is rotatably mounted. Secured to one end of the shaft is a collar or abutment member 402 which is secured to the shaft by means of a set screw 404. A coil spring 406 is disposed between bearing member 398 and the abutment 402 for biasing the shaft 400 in a righthand direction as viewed in FIGURE 19.

Figure 21:
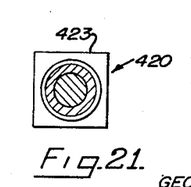
FIGURE 21 is a detail sectional view taken substantially on the line 21—21 of FIGURE 19.

The shaft 400 forms an integral part of an arbor 408 of larger diameter. The arbor portion 408 has a threaded bore adapted to receive a threaded tenon 409 of a hardened member or arbor section 410 which forms an extension of the arbor 408. The arbor section 410 is formed with a spiral groove or threaded portion 412 which provides the matrix for forming an internal thread upon the work piece W. A sleeve 414 is secured to the arbor 408 by means of a pin 416. Also pinned or otherwise secured to the shaft portion 400 of the arbor is a member or block 420 which is of square or polygonal configuration as shown in FIGURE 21.

Figure 19:
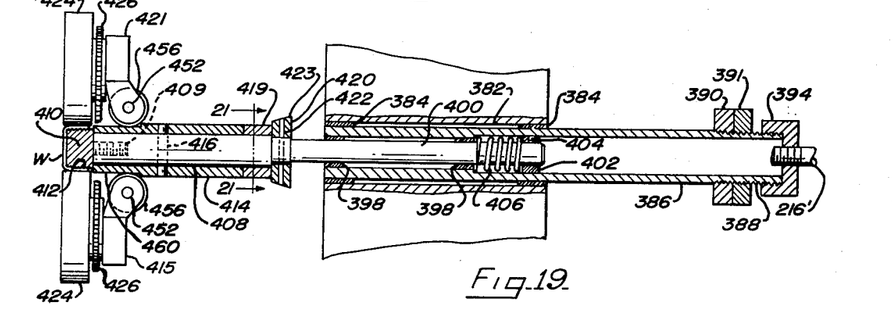
FIGURE 19 is a longitudinal sectional view of the arrangement shown in FIGURE 17, the section being taken substantially on the line 19—19 of FIGURE 17.
Figure 20:
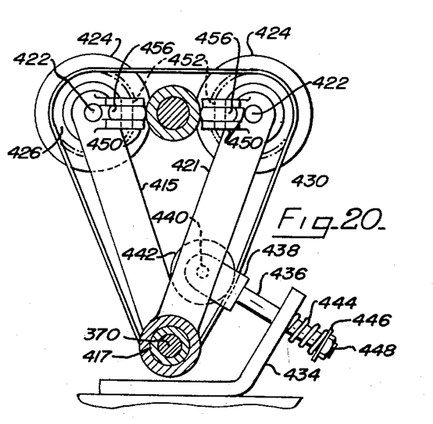
FIGURE 20 is a vertical sectional view taken substantially on the line 20—20 of FIGURE 17.

The member 420 is secured to the shaft 400 by means of a pin 422. The exterior periphery or surface zone 423 of member 420 is of frusto-conical shape. The slide or carriage 380 is provided with a projection 426 on which is mounted a plate spring 428 which is adapted to be engaged by the block or member 420 in certain positions of the shaft 400. The polygonal shape of the member 420 cooperates with the plate spring 428 to hold the arbor 408 in relatively stationary position during the operation of removing the threaded and knurled work piece from the work supporting section 410 of the arbor. The arrangement shown in FIGURES 17 through 21 includes a modified form of means for removing the completed or finished work piece W from the arbor section 410. The means for removing the completed work piece is supported upon the shaft 370 and is inclusive of an arm 415 having a sleeve-like portion 417 journalled upon the shaft 370 whereby the arm 415 is journalled upon the shaft. A second arm 421 is bored interiorly and is journalled upon the sleeve 417 of the arm 415. The portions of the arms 415 and 421 at the zone adjacent the work removing station are in transverse alignment as shown in FIGURE 19. Each of the arms is provided with a pin or shaft 422 upon which is journalled a work removing roll 424. Secured to each work removing roll 424 is a sprocket 426. Also fixedly secured to the shaft 370 is a sprocket 428 and a chain 430 connects the sprockets 426 and 428 whereby the work removing rolls 424 are continuously driven from the shaft 370.

A plate 434 supports a means for tensioning the chain 430. The plate 434 is bored to accommodate a rod 436 provided with a clevis 438 equipped with a pin or shaft 440. An idler sprocket 442 is journalled upon the pin 440 and engages the chain 430 in the manner shown in FIGURE 20. A coil spring 444 is disposed between the plate 434 and an abutment or washer 446 held on the shaft 436 by a nut 448. The spring 444 biases the idler sprocket 442 in a direction to take up slack or last motion of the chain and to provide for limited lateral movement of the work removing rolls 424 out of engagement with the work. Each of the arms 415 and 421 is provided with a pair of spaced lugs or bosses 450 which are bored to receive pins 452. Journally supported on each pin 452 and disposed between the lugs of each pair is a roller 456. As shown in FIGURE 19, the rollers 456 engage a portion 460 of the sleeve 414 which is of reduced diameter so as to permit the peripheral surfaces of the rolls 424 to engage and unthread or remove the work piece W from the arbor section 410. FIGURE 19 illustrates the rolls 424 in work removing position.

During the period that the arbor 408 is advanced to dispose the work blank in position where the internal thread forming and external knurling operations are performed, the rollers 456 are in engagement with the portion 460 of reduced diameter. When the arbor 408 is advanced the larger diameter of the sleeve 414 engages the rollers 456 causing the arms 415 and 421 to be swung about the axis of shaft 370 in opposite directions to hold the work removing rolls 424 out of engagement with the work and the sleeve 414.

Mounted upon the arbor 408 adjacent the member 420 is a collar 419 freely rotatable on the arbor. When the arbor is fully advanced to position the work adjacent the thread forming and knurling rolls, the rollers 456 engage the peripheral surface of the collar 419 and thereby facilitate rotation of the arbor 408 and the sleeve 414 secured thereto during work performing operation.

The electrical control system or arrangement and the fluid pressure actuators for the apparatus shown in FIGURES 17 through 21 are identical with those disclosed and described in connection with the form of apparatus shown in FIGURES 1 through 11 and 14 through 16.

It should be noted that in this form of apparatus, only one arbor is provided for supporting the work piece and that the arbor is slidable in the direction of its axis and the fluid pressure actuator identical with actuator 212 connected with the piston rod 216' reciprocates the arbor 408 and elements associated therewith in the same manner that the slide 16 is reciprocated in the form of apparatus shown in FIGURES 1 and 2.

The operation of the form of apparatus shown in FIGURES 17 through 21 is as follows: The motor (not shown) connected with the driving belts 361 is started so as to continuously rotate the shafts 358 and 370. The shaft 358 continuously rotates the pinion 52' which drives the gears 126' and hence the pressure rolls at a constant rate of speed. The operator then closes the switch 301 of the circuit shown in FIGURE 11 to initiate a cycle of operations. The closing of the circuit effects delivery of compressed air to an actuator to advance the piston rod 216' shown in FIGURES 17 and 19 and advance the sleeve 386 and the arbor 408 together with the threaded or grooved section 410 of the arbor. The latter moves through the work feeding device 175' and picks up a work piece which is conveyed by further advancing movement of the arbor 408 into position to be operated upon by thread forming and knurling rolls.

During this period of advancement of the arbor the rollers 456 are in engagement with the exterior surface of larger diameter of the sleeve 414 which holds or maintains the work removing rolls 424 in spaced apart relation.

When the arbor 408 is in its fully advanced position, the rollers 456 are engaged with the freely rotatable collar 419 so that the arbor may rotate during work performing operations. After the thread forming and knurling operations have been completed upon the work piece W, the actuator connected with the piston rod 216' is operated in a reverse direction through the electrical control arrangement illustrated in FIGURE 11 to retract the arbor 408 and the sleeve 386 to the position shown in FIGURES 17 and 19.

As the arbor 408 approaches its limit of retractive movement, the polygonally shaped member 420 engages the plate spring 428 to prevent further relative rotation of the arbor 408 and the sleeve 414. As the member 420 engages the plate spring 428, the rollers 456 engage the portion 460 of reduced diameter of the sleeve 414 and the rolls 424, under the tension of the chain tensioning spring 444, are caused to engage the periphery of the finished work piece W and quickly unthread or unscrew the finished work piece from the grooved arbor section 410, the rolls 424 rotating in a direction to establish the unthreading action. The peripheral surfaces of the rolls 424 may be roughened, serrated or knurled in order to establish effective frictional gripping action with the work piece in order to avoid slippage between the rolls and the work piece during the unthreading or work removing operation.

It is to be understood that while two work removing rolls have been illustrated, satisfactory results may be obtained through the use of a single work removing roll. At the completion of the retractive movement of sleeve or shaft 386, the work removing rolls 424 engage and grip the completed work W. The spring 406 is in compressed condition and the arbor 408 is not completely retracted until the work piece is removed from the arbor section 410. During the period in which the rolls 424 unthread or unscrew the work W from the section 410, the spring 406 continuously biases or urges the arbor 408 in a righthand direction as viewed in FIGURE 19 and, when the section 410 is disengaged from the work, the latter falls into a chute for conveying the pieces away from the apparatus and the spring 406 completes the retraction of the arbor 408 in preparation for the initiation of the next cycle.

We claim:

1. Apparatus of the character disclosed, in combination, a frame, a member supported upon the frame, a plurality of shafts, eccentric sleeves rotatably supported on said member, each of said sleeves journally supporting one of the shafts, means for rotating said shafts simultaneously, a pressure roll having a smooth exterior surface carried upon each of said shafts, a knurling roll of lesser diameter than the pressure roll journaled on each of said pressure rolls, an arbor movably supported on the frame and having a threaded portion adapted to support a hollow work piece, means for moving the arbor to bring the work piece adjacent the pressure and knurling rolls, an element mounted for rotation about the axis of the arbor, means connecting the eccentric sleeves with the element, means for rotating said element and said eccentric sleeves to move the rolls into engagement with the work piece to distort the work piece and thereby form an internal thread on the work piece and an exterior knurled zone and smooth surfaced area on the exterior of the work piece, said arbor moving means being arranged to withdraw the arbor and formed work piece from the zone of the rolls.

2. Apparatus of the character disclosed, in combination, a frame, member supported upon the frame, a plurality of shafts, eccentric sleeves rotatably journaled on said member, each of said sleeves journally supporting one of the shafts, means for simultaneously rotating said shafts, a pressure roll having a smooth exterior surface carried upon each of said shafts, a knurling roll journally supported at each side of each of the pressure rolls, said knurling rolls being of lesser diameter than the pressure rolls, an arbor reciprocably and rotatably supported upon said frame and having an exterior threaded portion adapted to support a hollow work piece, means for moving the arbor to bring the work piece adjacent the pressure and knurling rolls, an element rotatable about the axis of the arbor, means connecting each of the eccentric sleeves to the element, means for rotating the element and sleeves to concomitantly move the rolls in radial directions into engagement with the work piece to distort the metal of the work piece and thereby form an internal thread in the work piece and two knurled zones spaced by a smooth surface on the exterior of the work piece, said arbor moving means being arranged to retract the arbor and formed work piece away from the zone of the rolls.

3. Apparatus for forming an internal thread and external knurling on a tubular member including, in combination, a frame, a work carrying arbor having a spiral groove formed therein reciprocably supported on said frame, electrically controlled fluid actuated means for reciprocating said arbor, means for feeding tubular members into a position in the path of movement of the arbor whereby a member is deposited on the grooved portion of the arbor during reciprocation thereof, a plurality of pressure rolls each formed with a smooth cylindrical surface, a plurality of knurling rolls of lesser diameter than the pressure rolls, means for rotating said pressure rolls, eccentric sleeves mounting said pressure and knurling rolls, electrically controlled fluid actuated means for rotating the eccentric sleeves to move the pressure and knurling rolls generally radially of the member on the arbor and into engagement therewith to distort the member and thereby form an internal thread on the member and a smooth cylindrical surface and a knurled configuration on the exterior of the member.

4. Apparatus for forming an internal thread and external knurling on a tubular member, in combination, a frame, a longitudinally movable work carrying arbor having a spiral groove formed therein supported on said frame, means for moving said arbor, means for feeding tubular members into a position in the path of movement of the arbor whereby a member is deposited on the grooved portion of the arbor during movement thereof, a plurality of smooth surfaced pressure rolls, a plurality of knurling rolls of lesser diameter than the pressure rolls, means for rotating said pressure rolls, eccentric means mounting said pressure and knurling rolls, means for concomitantly moving the eccentric means to actuate the pressure and knurling rolls into engagement with the member on the arbor to distort the member and thereby form an internal thread on the member and a knurled configuration and a smooth surfaced zone on an exterior surface region of the member.

References Cited in the file of this patent

UNITED STATES PATENTS

| | | |
|---|---|---|
| 125,257 | Belts | Apr. 2, 1872 |
| 748,276 | Gabriel | Dec. 29, 1903 |
| 1,172,427 | Carlson | Feb. 22, 1916 |
| 1,287,669 | Gilette | Dec. 17, 1918 |
| 1,546,091 | Lewis | July 14, 1925 |
| 1,775,732 | Nelson | Sept. 16, 1930 |
| 1,792,812 | Cameron | Feb. 17, 1931 |
| 2,054,182 | Unke | Sept. 15, 1936 |
| 2,122,525 | Huntsman | July 5, 1938 |
| 2,465,253 | Montelione | Mar. 22, 1949 |
| 2,518,009 | Hess | Aug. 8, 1950 |
| 2,624,218 | Flanders et al. | Jan. 6, 1953 |
| 2,639,757 | Cheek | May 26, 1953 |
| 2,644,999 | Hill | July 14, 1953 |
| 2,669,139 | Finch | Feb. 16, 1954 |
| 2,722,698 | Green | Nov. 8, 1955 |